United States Patent
Wang et al.

(10) Patent No.: US 11,170,114 B2
(45) Date of Patent: Nov. 9, 2021

(54) ELECTRONIC STORAGE SYSTEM AND A METHOD OF DATA MANAGEMENT

(71) Applicant: City University of Hong Kong, Kowloon (HK)

(72) Inventors: Cong Wang, Shatin (HK); Xingliang Yuan, Shatin (HK); Chengjun Cai, Shatin (HK)

(73) Assignee: City University of Hong Kong, Kowloon (HK)

( * ) Notice: Subject to any disclaimer, the term of this patent is extended or adjusted under 35 U.S.C. 154(b) by 432 days.

(21) Appl. No.: 15/614,905

(22) Filed: Jun. 6, 2017

(65) Prior Publication Data
US 2018/0349617 A1   Dec. 6, 2018

(51) Int. Cl.
*G06F 21/60* (2013.01)
*H04L 9/32* (2006.01)
*G06F 21/64* (2013.01)

(52) U.S. Cl.
CPC ............ *G06F 21/602* (2013.01); *G06F 21/64* (2013.01); *H04L 9/3239* (2013.01); *H04L 9/3247* (2013.01); *H04L 2209/38* (2013.01)

(58) Field of Classification Search
CPC ...... G06F 21/602; G06F 3/067; G06F 3/0623; G06F 3/0604; G06F 3/0644; G06F 3/0608; G06F 3/0631; G06F 3/064; G06F 3/0683; G06F 16/1837; G06F 21/64; H04L 9/14; H04L 9/3247; H04L 67/104; H04L 67/1076; H04L 67/1063; H04L 67/1068; H04L 67/108; H04L 63/0428; H04L 67/1097; H04L 9/3239; H04L 2209/38

See application file for complete search history.

(56) References Cited

U.S. PATENT DOCUMENTS

| | | |
|---|---|---|
| 9,397,985 B1 | 7/2016 | Seger, II et al. |
| 2012/0078914 A1 | 3/2012 | Roeder et al. |
| 2013/0046974 A1 | 2/2013 | Kamara et al. |
| 2013/0212528 A1 | 8/2013 | Lazaridis et al. |
| 2014/0317412 A1 | 10/2014 | Artishdad et al. |
| 2016/0125198 A1 | 5/2016 | Hahn et al. |
| 2016/0203575 A1 | 7/2016 | Madhu et al. |
| 2017/0118028 A1* | 4/2017 | Hayes ................ G06F 12/1458 |

\* cited by examiner

*Primary Examiner* — Brian F Shaw
(74) *Attorney, Agent, or Firm* — Renner Kenner Greive Bobak Taylor & Weber

(57) ABSTRACT

An electronic storage system and a method of data management includes the steps of: partitioning source data into a plurality of portions of data; storing each of the plurality of portions of data in each of a plurality of storage peers respectively; and storing a plurality of indices in a plurality of storage peers; wherein each of the plurality of indices corresponds to each respective portion of partitioned data; and wherein each of the plurality of storage peers is arranged to store the plurality of indices and the plurality of portions of data in corresponding pairs.

23 Claims, 4 Drawing Sheets

ELECTRONIC STORAGE SYSTEM AND A METHOD OF DATA MANAGEMENT

TECHNICAL FIELD

The present invention relates to an electronic storage system and a method of data management, and particularly, although not exclusively, to a system and a method of data management in an encrypted decentralized storage system.

BACKGROUND

Data or information may be digitally stored in an electronic storage system. For example, a document may be saved as one or more electronic files and stored in an electronic storage medium such as an optical disc or a magnetic drive. When a user needs to retrieve the information saved in the document, the user will need to locate the specific file in the electronic storage system.

In some advanced method of data management, electronic files may be distributed and stored in multiple storage locations. However, operations such as searching and/or retrieving the required files may be difficult as this may heavily depend on the communication links in the distributed storage system. In addition, performances may be affected by the processing power of each of the individual storage devices contributing to the distributed storage system.

Furthermore, data stored in remote repositories may expose to user privacy issues such as data breaches and hacking activities. Therefore secured storage systems and methods are usually preferable by end users.

SUMMARY OF THE INVENTION

In accordance with a first aspect of the present invention, there is provided a method of data management, comprising the steps of: partitioning source data into a plurality of portions of data; storing each of the plurality of portions of data in each of a plurality of storage peers respectively; and storing a plurality of indices in a plurality of storage peers; wherein each of the plurality of indices corresponds to each respective portion of partitioned data; and wherein each of the plurality of storage peers is arranged to store the plurality of indices and the plurality of portions of data in corresponding pairs.

In an embodiment of the first aspect, the plurality of storage peers combines to define a decentralized storage volume.

In an embodiment of the first aspect, the plurality portions of data and the plurality of indices are encrypted.

In an embodiment of the first aspect, the method further comprises the step of initializing the plurality of storage peers associated a client arranged to store the plurality of portions of data in the plurality of storage peers.

In an embodiment of the first aspect, the step of initializing the plurality of storage peers associated with the client comprises the step of initializing the client with private keys associated with the encrypted portions of data and indices, an empty set arranged to store set hashes, an empty list arranged to maintain a search history and a set hashing function.

In an embodiment of the first aspect, the set hashing function is shared by the client and the plurality of storage peers.

In an embodiment of the first aspect, the step of initializing the plurality of storage peers associate with the client comprises the step of initializing each of the plurality of storage peers with an encrypted file index, a keyword search index, a posting list arranged to store keyword search results and an empty table to store set hashes.

In an embodiment of the first aspect, the step of initializing the plurality of storage peers associate with the client comprises the step of generating a pair of public key and private key associated with the encrypted data and indices.

In an embodiment of the first aspect, the method further comprises the step of adding a new file in at least one of the plurality of storage peers by: generating an add token including at least one of the plurality of portions of data and the corresponding indices; signing the add token; and transferring the signed add token to the at least one of the plurality of storage peers.

In an embodiment of the first aspect, the step of adding the new file further comprising the step of verifying and storing the add token in the storage peer.

In an embodiment of the first aspect, the step of adding the new file further comprising the step of updating the encrypted file index and the keyword search index associated with the new file.

In an embodiment of the first aspect, the method further comprises the step of searching the plurality of portions of data stored in the plurality of storage peers.

In an embodiment of the first aspect, the step of searching the plurality of portions of data comprising the step of: generating, in the client, a search token including at least one search keyword; signing the search token; and transferring the signed search token to the at least one of the plurality of storage peers.

In an embodiment of the first aspect, the step of searching the plurality of portions of data further comprising the step of verifying and processing the search token in the storage peer.

In an embodiment of the first aspect, the method further comprises the step of maintaining a ledger arranged to record at least one operation associated with the plurality of portions of data or the plurality of indices.

In an embodiment of the first aspect, the ledger includes at least one unmodifiable entry associated with the at least one operation.

In an embodiment of the first aspect, the at least one operation includes adding a new file and/or processing a search request.

In an embodiment of the first aspect, the ledger includes a blockchain structure.

In an embodiment of the first aspect, the method further comprises the step of issuing a fair judgment request based on at least one operation recorded in the ledger.

In an embodiment of the first aspect, each of the records associated with the at least one operation is time-stamped; and wherein at least one expired records in the ledger is not processed.

In accordance with a second aspect of the present invention, there is provided an electronic storage system, comprising a plurality of storage peers arranged to store a plurality of portions of data and a plurality of indices; wherein the a source data is partitioned to form the plurality of portions of data; wherein each of the plurality of indices corresponds to each respective portion of partitioned data; and wherein each of the plurality of storage peers is arranged to store the plurality of indices and the plurality of portions of data in corresponding pairs.

In an embodiment of the second aspect, the plurality of storage peers combines to define a decentralized storage volume.

In an embodiment of the second aspect, the plurality portions of data and the plurality of indices are encrypted.

In an embodiment of the second aspect, the plurality of storage peers is arranged to receive and process an add token including at least one of the plurality of portions of data and the corresponding indices so as to add a new file in the plurality of storage peers; wherein the add token is generated in a client adding the new file.

In an embodiment of the second aspect, the plurality of storage peers is arranged to receive and process a search token including at least one search keyword; wherein the search token is generated in a client initiating a search request.

In an embodiment of the second aspect, the system further comprises a ledger arranged to record at least one operation associated with the plurality of portions of data or the plurality of indices.

In an embodiment of the second aspect, the ledger includes at least one unmodifiable entry associated with the at least one operation.

In an embodiment of the second aspect, the at least one operation includes adding a new file and/or processing a search request.

In an embodiment of the second aspect, the ledger includes a blockchain structure.

In an embodiment of the second aspect, the plurality of storage peers are further arranged to issue a fair judgment request based on at least one operation recorded in the ledger.

In an embodiment of the second aspect, each of the records associated with the at least one operation is time-stamped; and wherein at least one expired records in the ledger is not processed.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
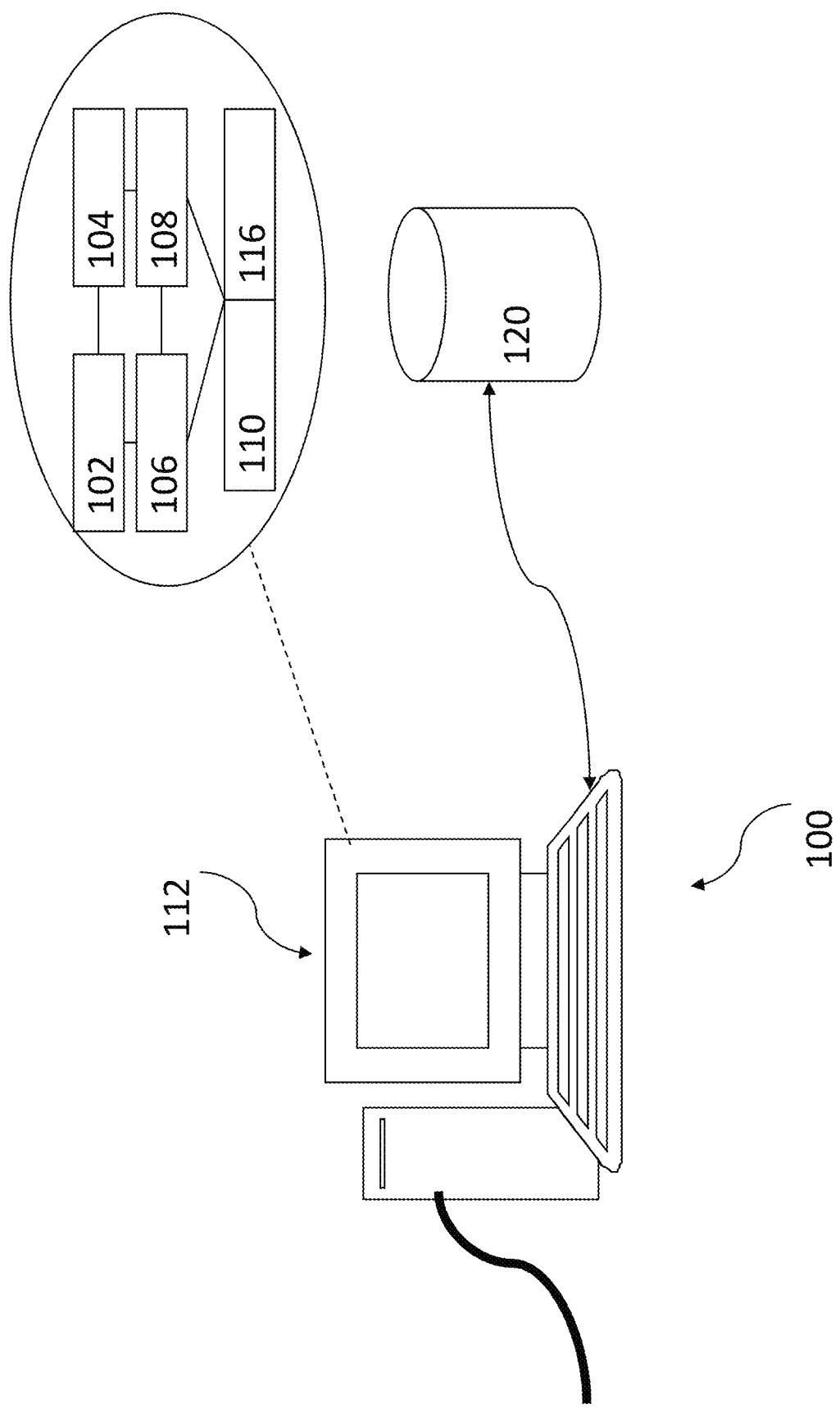
FIG. 1 is a schematic diagram of a computing server for operation as an electronic storage system in accordance with one embodiment of the present invention.

The inventors have, through their own research, trials and experiments, devised that decentralized storage is a storage service that does not rely on a centralized storage service provider. Some exemplary systems may leverage blockchain technology to achieve consensus on file integrity and may tie cryptocurrencies to facilitate autonomous payment. Compared to centralized cloud storage services, the decentralized systems may offer file outsourcing services in much lower cost.

Decentralized storage platforms may allow users to store outsourced files on one or more storage peers who are leasing their hard drive space to the service. To achieve trustworthy services and facilitate autonomous payment with cryptocurrencies, blockchain technology may be employed as their core structure. For example, blockchain structured file storage may be used and it provides proof-of-retrievability (PoR) on the blockchain to encourage proper maintenance of the outsourced files. In another example, the blockchain may be used as a data store for file blocks. These two systems may not ensure strong privacy protections on the contents of files.

In an alternative example, end-to-end encryption may be employed and cryptographic digests of files may be stored on the blockchain to tie up storage rental connections and enable file integrity check. However, it only support limited search functions, where a file may only be located via its identifier.

To ensure user privacy, systems may implement client-side encryption to protect the confidentiality of files in distributed storage peers. However, some encrypted storage platforms may not support secure keyword search functions. Users may only use file identifiers to retrieve files from the service.

Without wishing to be bound by theory, private keyword search protocol may relate to searchable symmetric encryption (SSE). For example, the security notion of SSE may be formalized and introduced with sub-linear search time. A dynamic SSE process that supports adding and deleting files may be used.

Searchable symmetric encryption (SSE) may consists of encryption, search, and (possibly) update algorithms. The encryption algorithm takes as input a secret key K, a file set F, and outputs the file ciphertext set C and an encrypted searchable index I. The search algorithm takes as input a secret key K, a keyword w, and outputs a search token t and a set of matched encrypted files R. If the process includes an update algorithm, it is known as a dynamic SSE process. The update algorithm takes as input K and a file f, and outputs an update token t' and an updated index I'. SSE may be adopted for its high efficiency on secure updates.

To improve I/O efficiency, SSE may be implemented to handle the case that the index is too huge to entirely be stored in the memory. In another example, an encrypted key-value store that supports encrypted keyword search over distributed servers may be included. SSE may also be extended to enable similarity search over encrypted high dimensional records. However, some SSE implementations may only address the threats from passive adversaries.

In yet an alternative example, a verifiable dynamic SSE method may be used to deal with malicious adversaries who might modify search results. Therefore, it may be preferable to start from a dynamic efficient SSE process, and then carefully customize the method by integrating it with cryptographic incremental hashing and blockchain while minimizing the overhead of maintaining trustworthiness in search and storage functions in decentralized storage services.

Bitcoin may be considered as an example application of the blockchain. Another example application may include Ethereum which involve a decentralized smart contract system based on the blockchain structure. With Ethereum, more and more applications such as prediction market and supply chain provenance may be developed. In another example, a global naming system that leverages the blockchain as a consensus ledger for triggering state changes on the upper layer service is provided.

For privacy protection, in one example embodiment, a smart contract design that stores encrypted data and contracts on the blockchain while leveraging zero-knowledge proofs to ensure the correctness of contract execution and money conservation is provided. Besides, blockchain based methods may also be used enhance secure multi-party computation protocols.

In one example, the present invention provides an embodiment of an encrypted decentralized storage architecture with the trustworthy and private keyword search function enabled. The inventors have observed two primary challenges.

Firstly, some encrypted search techniques, also known as searchable encryption, involve a centralized setting. How these techniques may be employed in a distributed setting is a non-trivial task. Preferably, search latency should be minimized while user files and queries should be strongly protected.

Secondly, the inventors devise that deploying a keyword search service to decentralized storage may face potential, serious threats. Peers within the storage service are untrusted without enforced regulations, and thus can be malicious. For example, peers could delete other users' files or corrupt search results intentionally. They could also fraudulently refuse or avoid to pay the service fees to peers who provide storage and search services.

Therefore, it is preferable to enable users to check the integrity of files and search results and to bring fair judgments.

In order to resolve the challenges above, in one example embodiment, the techniques in searchable symmetric encryption (SSE), cryptographic incremental hashing and blockchain may be combined, to form a decentralized storage system provided with a distributed architecture that enables trustworthy and private keyword search over encrypted files.

With reference to FIG. 1, an embodiment of the present invention is illustrated. This embodiment is arranged to provide an electronic storage system, comprising a plurality of storage peers arranged to store a plurality of portions of data and a plurality of indices; wherein the a source data is partitioned to form the plurality of portions of data; wherein each of the plurality of indices corresponds to each respective portion of partitioned data; and wherein each of the plurality of storage peers is arranged to store the plurality of indices and the plurality of portions of data in corresponding pairs.

Preferably, in one example, the electronic storage system may be used to stored files provided by a client terminal or device. By using the method in accordance with the embodiments of the present invention, the files may be stored in a plurality of distributed storage peers paired with respective file indices, so as to provide a decentralized storage service with the advantages of both the security level of a centralized storage method and the performance of a decentralized storage method.

In this embodiment, the electronic storage system, the plurality of storage peers and/or the client terminal may be implemented by or for operation on a computer having an appropriate user interface. The computer may be implemented by any computing architecture, including stand-alone PC, client/server architecture, "dumb" terminal/mainframe architecture, or any other appropriate architecture. The computing device is appropriately programmed to implement the invention.

Referring to FIG. 1, there is shown a schematic diagram of a computer or a computing server 100 which in this embodiment comprises a server 100 arranged to operate, at least in part if not entirely, the electronic storage system in accordance with one embodiment of the invention. The server 100 comprises suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices. At least one of a plurality of communications link may be connected to an external computing network through a telephone line or other type of communications link.

The server may include storage devices such as a disk drive 108 which may encompass solid state drives, hard disk drives, optical drives or magnetic tape drives. The server 100 may use a single disk drive or multiple disk drives. The server 100 may also have a suitable operating system 116 which resides on the disk drive or in the ROM of the server 100.

The system has a database 120 residing on a disk or other storage device which is arranged to store at least one record 122. The database 120 is in communication with the server 100 with an interface, which is implemented by computer software residing on the server 100.

Alternatively, the database 120 may also be implemented as a stand-alone database system in communication with the server 100 via an external computing network, or other types of communication links.

Without wishing to be bound by theory, to minimize search latency, file and index locality may be preferable. Encrypted files and related indexes may be stored in the same peer to reduce the communication overhead. File location can be determined by rental marketing services in some decentralized storage platforms. As the file and index locality is preserved, searchable encryption methods may be applied to protect the confidential files and query keywords.

To enable trustworthy keyword search functions, a cryptographic incremental hashing method (hereinafter referred as "(Multi)set hashing") may be employed to allow the clients to verify the search results returned from the corresponding peers. Preferably, this method may introduce optimal storage overhead and may support data dynamic efficiently.

(Multi)set hashing function may be defined as quadruple of probabilistic polynomial algorithms (H, $\equiv_H$, $+_H$, $-_H$) such that H maps sets included in the superset $s$, for all S $\sqsubset$ $s$, $$H(S) \equiv_H H(S).$$

$$\forall x \in \mathbb{S} \setminus S, H(S \cup \{x\}) \equiv_H H(S) +_H H(\{x\}).$$

$$\forall x \in S, H(S \setminus \{x\}) \equiv_H H(S) -_H H(\{x\}).$$

Preferably, a collision resistant multiset hashing function H may be used to realize an efficient verifiable searchable encryption method.

To further address possible fraudulent behaviors of clients, the ledger may include a blockchain structure. Preferably, the blockchain (or block chain) global ledger may support fair judgments for storage and search services that the peers provide. The digests of encrypted files, the tokens of search queries, and the metadata for integrity checking may be treated as transactions to be recorded into a blockchain as an undeniable proof. As a result, provable judgments may be conducted to demonstrate that the corresponding peers indeed provide the correct services.

Blockchain structure may be included as a precaution to address the double spending attack in cryptocurrency networks. It may also be an independent structure that serves as an attested log, where records are batched into time-stamped blocks. Features on the blockchain are elaborated as the follows: (1) Transparency—any peers within the network are allowed to read this blockchain and figure out what is the world state of the data stored within the network; (2) Consensus—a blockchain will finally reach consensus and the newly-mined information broadcast by honest clients will surely be stored in the blockchain; (3) Unmodified, Verifiable—blockchain structure is auditable for all peers in the network, once a block is mined and the consensus is achieved, no modification is further implemented in this block.

A smart contract may run on a shared, replicated ledger (i.e., blockchain), which processes information, and meanwhile receives, stores, and sends data. Each smart contract may include a unique address and can be triggered by addressing a transaction to it. Through the procedures stored on the smart contract, different events will be triggered, and the transaction will be recorded on the blockchain.

In yet another example embodiment, the method in accordance with the present invention may support secure file dynamic operations. To preserve the above security guarantees without introducing much overhead, a searchable encryption method is optimized for efficient updates. It allows the peers to construct a searchable index incrementally when processing secure queries. The method may be integrated with the (Multi)set hashing method and blockchain structure to minimize the cost of maintaining the trustworthiness in the service.

Figure 2:
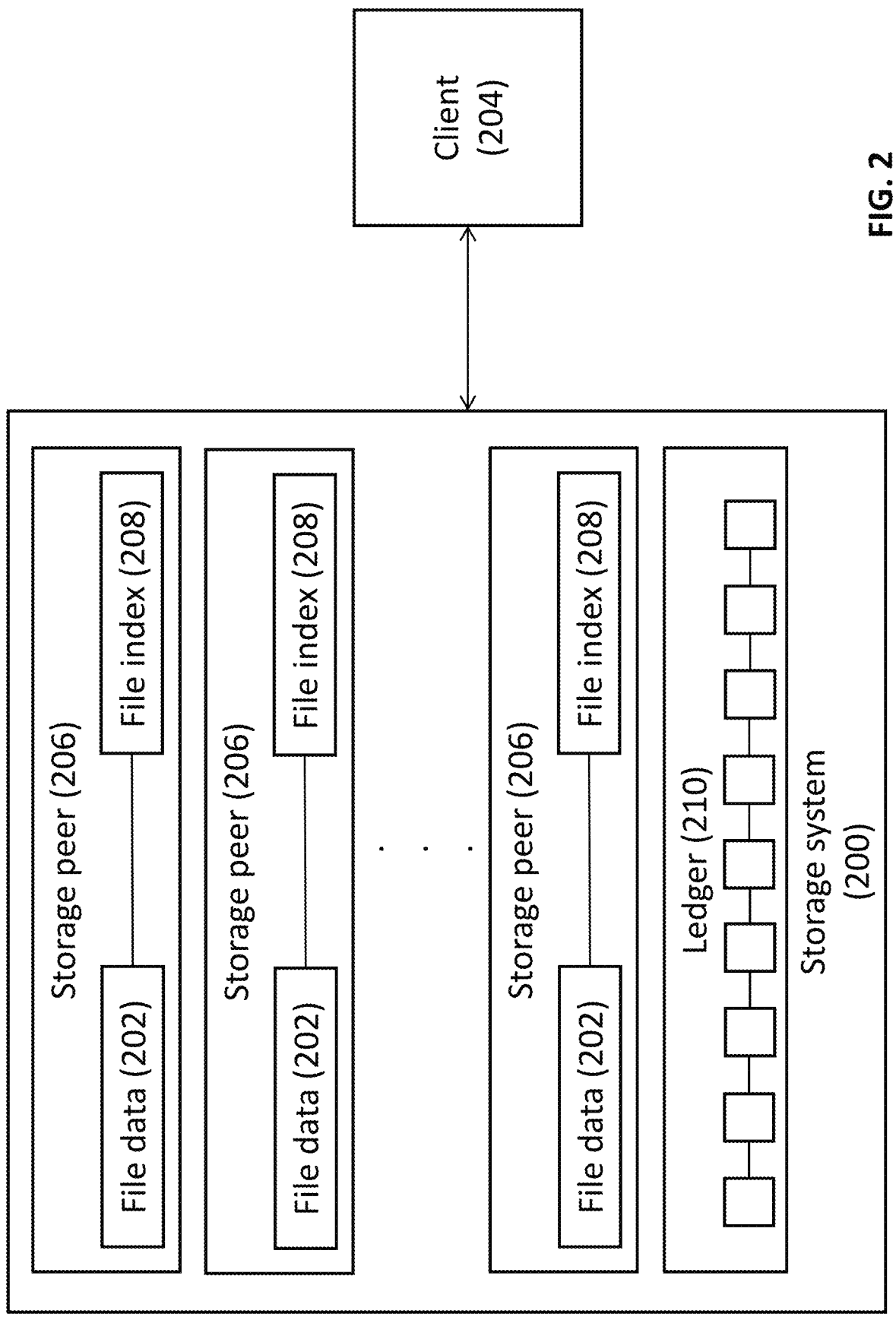
FIG. 2 is a schematic diagram of an embodiment of the electronic storage system in accordance with one embodiment of the present invention.

With reference to FIG. 2, there is shown an embodiment of the system 200 for use as an electronic storage system. In this embodiment, the server 100 may be used as part of the electronic storage system 200 arranged to store one or more portions 202 of a source data. In this embodiment, the storage system 200 may communicate with a client 204 which may be external to the storage system 200. For example, the client 204 may communicate with the storage system 200 so as to provide instructions to the storage system 200, such as but not limited to file addition, modification, deletion and/or searching instructions.

Preferably, a plurality of storage peers 206 combines to define a decentralized storage volume. Therefore, it will be appreciated by a person skilled in the art that the server 100 may include or operate as one or more storage peers 206 within the storage system 200 for storing one or more portions 202 of data (or files) provided by the client 204.

To maintain the file and index locality, each of the plurality of storage peers 206 is arranged to store the plurality of indices 208 and the plurality of portions 206 of data in corresponding pairs. Therefore, by locating the indices 208 in the storage peer 206, the required file 202 or portions of data may be immediately located.

Figure 3:
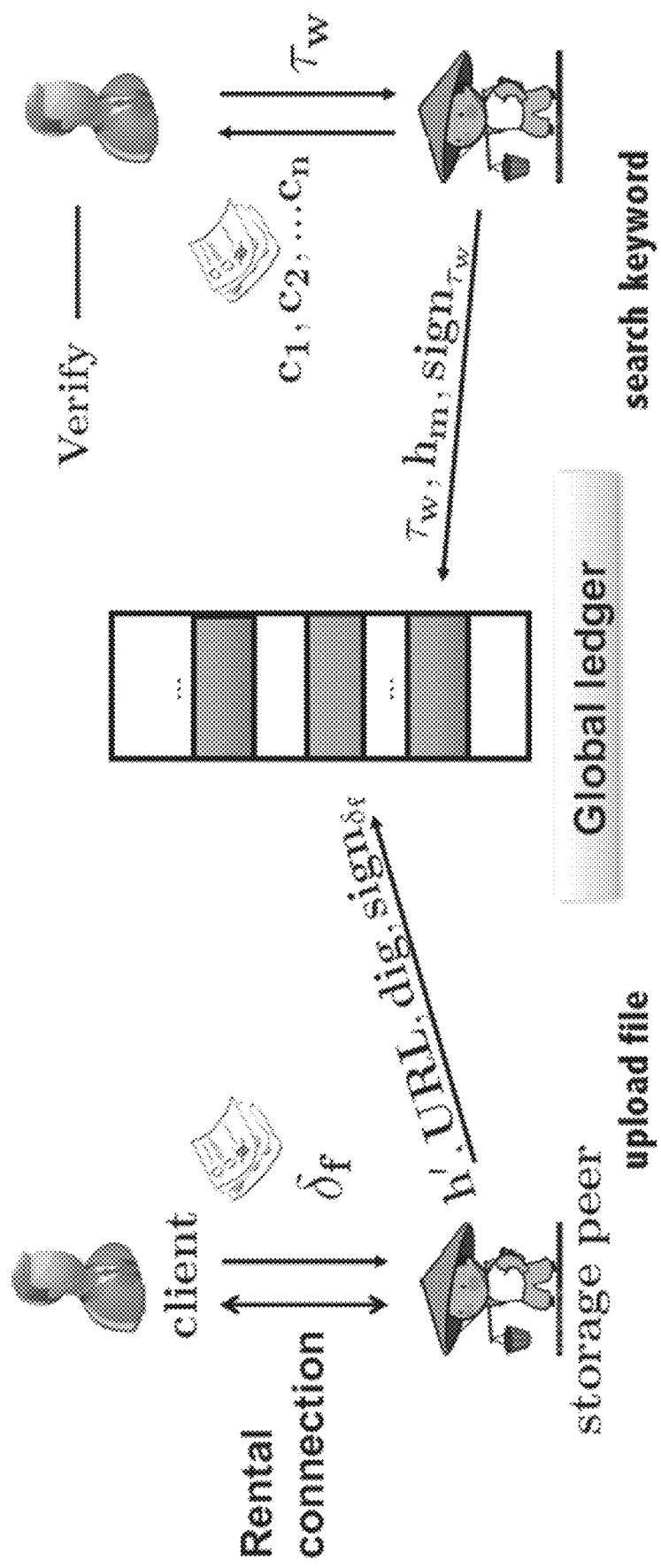
FIG. 3 is an illustration showing an example operation of the electronic storage system of FIG. 2.

The client (terminal) 204 may also be referred as a client peer, thus there may be two types of peers in the encrypted storage service, namely client peers and storage peers. With reference to FIG. 3, the clients 204 are data owners. They may outsource the files 202 and indexes 208 to targeted storage peers 206, and can conduct verifiable keyword search. In response to the client instructions, the storage peers 206 return search results and are rewarded for the storage and search functions they provide.

A peer 204/206 may switch its role in different contracts. The blockchain may be deployed as a global ledger 210 for fair judgments. Preferably, each peer may reach this global ledger 210 which is auditable. Each peer 204/206 may run a secure consensus protocol to agree upon its global state.

Preferably, the method of data management in accordance with the embodiments of the present invention may provide different functions: including system setup, file addition, keyword search, and fair judgment. Regarding the nature of the blockchain structure, only the file addition may be considered as the dynamic operation.

In system setup, it arranges space rental connections, and also initializes the client and its targeted storage peer. Preferably, this include initializing the plurality of storage peers associated a client arranged to store the plurality of portions of data in the plurality of storage peers.

Before a client 204 uploads the files 202 into the storage service, it needs to interact with one or more storage peers 206 to establish smart contracts for space rental connections. This phase can be conducted as the rental marketing phase in a storage platform. For example, a client 204 may connect to a storage peer 206, while it is also allowed to replicate files 202 to other storage peers 206 for security precautions with more service fees. After that, the electronic storage system 200 may initialize system parameters and data structures, including the secret keys of the client 204, the indexes 208 of the storage peer 206, and the set hashing function.

Given a file 202 to be stored into the storage service, the file addition function facilitates building up the "add token" and recording an add transaction to the blockchain for fair judgments. With a secret key and a file, the client 204 generates an add token $\delta_f$ and a ciphertext. Also, it may maintain a local checklist that stores the set hash of the new file. With $\delta_f$, the storage peer 206 may build up the encrypted file index or update the search index. Finally, a transaction that contains the signature of the add token, the set hash of the file, and some metadata is generated by the storage peer and is recorded on the blockchain according to a Proof-of-Work (PoW) procedures.

Regarding the searching feature, the keyword search function facilitates generating the search token, retrieving search results, and recording a search transaction for this search operation. After generating the search token $\tau_w$, the client 204 may send $\tau_w$ to its targeted storage peer 206 to perform secure keyword search. With the encrypted index 208, search results are returned. Finally, a search transaction that stores the set hash of the search results and the search token is generated and recorded on the blockchain. The clients 204 may also verify the integrity of results using their local (multi)set hashing checklist.

To detect malicious behaviors of peers, the fair judgement function facilitates conducting provable judgments. The add and/or search transactions recorded on the blockchain may used as undeniable proofs for other peers to repeat the search operations.

Consider the existence of untrusted peers, firstly, storage peers may try to learn from the client's private files and abuse them for their self-benefits. Secondly, storage peers might delete some of the encrypted files to save their processing expense and storage space. In addition, they could be compromised by hackers and then return incorrect search results back to the clients for malicious intentions. Thirdly, some clients might deny the storage and search services provided by the service peers, and thus refuse to pay the service fees. Preferably, the blockchain structure depends on Proof-of-Work (PoW) security, where no entity within the service will gather more than 50% of the processing power.

In an example embodiment of the present invention, the electronic storage system enables private and trustworthy keyword search over encrypted files in the decentralized storage service. First of all, file and index locality may be adopted, where the encrypted file and its encrypted keyword index may be stored in the same peer, thus minimizing the search latency since the interaction among peers is avoided. Preferably, the method may be provided with the following deployment benefits. Searchable symmetric encryption (SSE) techniques may readily be applied, since the encrypted index will not be partitioned to different peers. In addition, storing files and indexes to targeted peers is compatible to the rental marketing model as appreciated by a skilled person in the art.

The method also supports fair judgments on the integrity of files and search results. The following cases may trigger a fair judgment: 1) a client peer detects incorrect search results; 2) a storage peer claims that a client denies the fact that the correct search service is provided and refuses to pay the service fee. The latter case is intuitive, while the former case demands a method to allow the client to verify search results. Therefore, cryptographic incremental hashing may be utilized to realize verifiable searchable encryption. To further enable undeniable judgments, search tokens, file digests, and set hashes for search result verification may be recorded to the blockchain.

In addition, the method also enable secure file addition while minimizing the maintenance and storage overhead of the blockchain. Adopting common dynamic SSE may introduce enormous bandwidth and blockchain storage overhead, because the transactions for all updated keywords in the encrypted index need to be recorded to the blockchain. To address this issue, it may be preferably to deploy a dynamic SSE method with an efficient update process which may learn the search index from the access pattern during the search operations. Preferably, when a new file is added, only one transaction that contains the file metadata is recorded.

Preferably, the initializing step includes initializing the plurality of storage peers associated with the client comprises the step of initializing the client with private keys associated with the encrypted portions of data and indices, an empty set arranged to store set hashes, an empty list arranged to maintain a search history and a set hashing function.

In the setup phase of the storage service, the client may interact with the storage peer(s) and may negotiate a smart contract that performs the storage and search services and indicates the rental connections and duration. The client initializes $k_1$, $k_2$, $T_{client}$, $\theta$, and H, where $k_1$, $k_2$ are the private keys, $T_{client}$ is an empty set to store set hashes, $\theta$ is an empty list to maintain search history, and H is a collision resistant set hashing function.

In addition, the initializing step may further includes initializing the plurality of storage peers associate with the client comprises the step of initializing each of the plurality of storage peers with an encrypted file index, a keyword search index, a posting list arranged to store keyword search results and an empty table to store set hashes.

The storage peer(s) may initialize $\zeta_f$, $f_w$, $I_w$, and $T_{peer}$ where $\zeta_f$ is the encrypted file index, $\zeta_w$ is a keyword search index, $I_w$ is the posting list storing keyword search results, and $T_{peer}$ is an empty table to store set hashes. Preferably, the hashing function H is shared by the client and the plurality of storage peers.

Preferably, the initialization step may further includes initializing the plurality of storage peers associate with the client comprises the step of generating a pair of public key and private key associated with the encrypted data and indices. Accordingly, every peer may generate a public/secret key pair, denoted as (pk, sk). pk may be broadcast to other peers, while sk is kept secretly at local. Thus, the plurality portions of data and the plurality of indices may be encrypted. In the subsequent search and add operations, a client peer may send an add or search token to the targeted storage peer(s), and it is required to sign the token using its secret key $s_k$. Signatures for add token and search token are defined as $sign_{\delta_f}$ and $sign_{\tau_w}$. The token constructions will later be discussed in this disclosure.

In accordance with one embodiment of the present invention, the method further comprises the step of adding a new file in at least one of the plurality of storage peers by: generating an add token including at least one of the plurality of portions of data and the corresponding indices; signing the add token; and transferring the signed add token to the at least one of the plurality of storage peers. The new file(s) may be one or more portions of the source data which may be distributed or allocated to a plurality of storage peers in this operation.

In this example, If the client outsources a new file f to a storage peer, it first parses f into distinct keywords $(w_1, \ldots, w_{len(\alpha)})$, where a denotes the distinct word list of f. Then the client generates an add token as:

$$\delta_f = (ID(f), c^*, x, c, h', dig)$$

where ID(f) is the file ID, dig is the cryptographic file digest used for file integrity check, h' is a set hash generated by H(ID(f)), x is a reference list for keywords searched before, c is the encrypted file, and c* is the encrypted file index generated by a sequence of pseudorandom values $(s_1, \ldots, s_{len(\alpha)})$ that correspond to a, which is described in step 6a and 6f (Add token) in the example procedures as shown below. Afterwards, the client signs $\delta_f$ via $Sign_{sk}(\delta_f)$, where Sign can be a standard RSA signature process, and sends the signature $sign_{\delta_f}$ together with $\delta_f$ to the targeted storage peer. The client may also maintain the checklist $T_{client}$ and updates it with the file set hash h'.

The step of adding the new file further comprising the step of verifying and storing the add token in the storage peer. Once receiving $\delta_f$, the storage peer first checks the validity of $\delta_f$ using the client's public key pk. Then it verifies h' and stores $\delta_f$.

Additionally or optionally, the step of adding the new file further comprising the step of updating the encrypted file index and the keyword search index associated with the new file. In terms of the data in $\delta_f$, the peer updates the file index $\zeta_f$, keyword search index $\zeta_w$, and digest index $T_{peer}$ respectively, as shown in step 1a and 1b (Add) in example procedures as shown below.

Preferably, the system also maintains a ledger arranged to record at least one operation associated with the plurality of portions of data or the plurality of indices. This may include an operation of adding a new file. As discussed above, the ledger may include a blockchain structure, in which it includes one or more unmodifiable entry associated with the at least one operation being recorded.

After completing the above procedures, the storage peer may generates an add transaction:

$$trans_{add} = (h', URL, dig, sign_{\delta_f})$$

which includes the set hash h', the storage location URL, the file digest dig, and the signature $sign_{\delta_f}$ of the add token.

Then, the peer issues this transaction to its smart contract's address. Miners in the network will mine the transaction into the blockchain through a standard PoW procedure. Thus updating the ledger and recording the performed adding operations.

An example process of adding a new file is illustrated as follows:

---

CLIENT (Add token):
1) Initialize an empty list x.
2) Encrypt the file f with the key $k_2$ and get the encrypted file c.
3) Pre-generate a file integrity digest dig.
4) Create a list σ of unique words in f, which equals to $(w_1, ..., w_{len(\sigma)})$.
5) Compute h' = H(ID(f)).
6) for every $w_i \in \sigma$:
    a) Generate a pseudorandom value $s_i$.
    b) Compute $\tau_{w_i} = F_{k_1}(w_i)$, where F is a PRF and $k_1$ is the private key.
    c) if $T_{client}[\tau_{w_i}]$ exists, h ← $T_{client}[\tau_{w_i}]$, h* = h + h'. else, h* = h'.
    d) Set $(\tau_{w_i}, h^*) \to T_{client}$.
    e) if $\tau_{w_i} \in \theta$, add $\tau_{w_i}$ to x.
    f) Set $c_i = H_{\tau_{w_i}}(s_i) \| s_i$.
7) Sort c* = $(c_1, ..., c_{len(\sigma)})$ in lexicographic order and set $\delta_f$ = (ID(f), c*, x, c, h', dig).
8) Send $\delta_f$ and $sign_{\delta_f}$ to the targeted storage peer(s).

STORAGE PEER (Add):
1) for every $x_i \in x$:
    a) Add ID(f) to $\zeta_w[x_i]$.
    b) h ← $T_{peer}[x_i]$, h* = h + h'. Set h* → $T_{peer}[x_i]$.
2) Add $\delta_f$ to the leasing storage, c* → $\zeta_f$.
3) Generate an add transaction $trans_{add}$, which is defined as (h', URL, dig, $sign_{\delta_f}$).

---

Preferably, the method may facilitate searching of the plurality of portions of data stored in the plurality of storage peers. In one example embodiment, searching the plurality of portions of data comprising the step of: generating, in the client, a search token including at least one search keyword; signing the search token; and transferring the signed search token to the at least one of the plurality of storage peers.

To perform keyword search, the client may generate a search token $\tau_w$ via $F_{k1}(w)$, where F is a PRF and $k_1$ is the private key. Then, it updates the search history θ and signs the search token $\tau_w$ via $Sign_{sk}(\tau_w)$. Similar to file addition, after receiving $\tau_w$ from the client, the storage peer is arranged to verify and process the search token in the storage peer using the client's pk.

If $\tau_w$ is valid and the keyword has been searched before, it builds up the posting list $I_w$ and the set hash $h_m$ of result files via $\zeta_w[\tau_w]$ and $T_{peer}[\tau_w]$ directly. If the keyword has not been searched before, the peer scans the file index $\zeta_f$ to create the posting list $I_w$ and $h_m$. Explicitly, it parses every c* in to get $h_m$ using the set hashing function $+_H$ and $I_w$ by checking each c* through computing $H\tau_w(r_i)=l_i$ respectively. Here, $r_i$ is equal to the pseudorandom value $s_i$ and $l_i$ is the left λ-bit string of $c_i$, as is shown as step 3a (Search) in the example process as shown below. Meanwhile, the peer updates $\zeta_w$ and stores the newly generated $h_m$ to $T_{peer}$. After that, it returns $I_w$ to the client, and generates a search transaction defined as:

$$trans_{search} = (\tau_w, h_m, sign_{\tau_w})$$

which includes the search token $\tau_w$, the set hash $h_m$ of results, and the signature $sign_{\tau_w}$ of the search token. Finally, the transaction is broadcast and recorded on the blockchain, therefore updating the ledger of an operation of processing the search request.

Preferably, the client may also verify the search results through their local checklist $T_{client}$. The set hash h* may be generated from the returned $I_w$ and may be compared with Tclient[$\tau_w$].

An example process of initiating and processing a search request is illustrated as follows:

---

CLIENT (Search token):
1) Generate keyword w.
2) Utilize key $k_1$ and generate $F_{k1}(w) = \tau_w$.
3) Renew the search history θ' = θ ∪ {$\tau_w$}.
4) Send $\tau_w$ and $sign_{\tau_w}$ to the targeted storage peer(s).

STORAGE PEER (Search):
1) Parse the index $\zeta_f, \zeta_w$ and initialize $h_m$ and $I_w$. Check if there is an entry for $\tau_w$ in $\zeta_w$.
2) If yes, $I_w \leftarrow \zeta_w[\tau_w]$ and $h_m \leftarrow T_{peer}[\tau_w]$, jump to step 5).
3) else, for every c* ∈ $\zeta_f$:
    a) for every $c_i \in c^*$ that is i ∈ [1, len(c*)], set $c_i = l_i \| \tau_i$ and check if $H_{\tau_w}(\tau_i) = l_i$.
    b) If yes, then insert ID(f), which corresponds to c*, into $I_w$; aggregate h', which corresponds to ID(f), into $h_m$ via $h_m = h_m + h'$.
4) Create an entry $\zeta_w[\tau_w] \leftarrow I_w$ and $T_{peer}[\tau_w] \leftarrow h_m$.
5) Return encrypted files $(c_1, ...c_n)$, which correspond to $I_w$ = (ID($f_1$), ...ID($f_n$)), back to the client.
6) Generate a search transaction $trans_{search}$, which is defined as $(\tau_w, h_m, sign_{\tau_w})$.

---

In a preferable embodiment, the method further comprises issuing a fair judgment request based on at least one operation (i.e. adding/searching a file) recorded in the ledger.

Preferably, in the storage rental service, both clients and storage peers may be allowed to issue the fair judgment request. Once the request is triggered in their smart contract, both peers are obligated to provide the requested data to justify their behaviors.

To justify the correctness of the search results for a challenge search token $\tau_w$, the storage peers need to publish the file index $\zeta_f$ and their related add tokens {$\delta_f$} to other peers. First, the published $\zeta_f$ may be verified by checking if {$\delta_f$} matches with their signatures recorded on the blockchain. Then by repeating the keyword search operation on $\tau_w$, other peers can reconstruct a challenge set hash h* via parsing $\zeta_f$ and adding up all related set hashes on the chain. Finally, h* is compared with the hash $h_m$ in the previous search transaction recorded on the blockchain.

For file integrity, if the encrypted file is not split, the storage peer publishes the file and asks other peers to verify whether its digest equals to dig which is also recorded on the blockchain. If the encrypted file is stored in blocks, the client publishes the file's hash challenge, i.e., a Merkle tree structure without leaves, to the network. Then a Merkle tree challenge for the published encrypted file can be generated for verification.

Decentralized storage is an incentive driven service. In some examples, storage peers may be rewarded for the file storage and keyword search services they provide. Smart contracts may be adopted to achieve service contracting and rewarding. The issued smart contract may contain the rental service information, e.g., service duration, public keys of the client and storage peer(s). Besides, different features may be provided, including but not limited to: a) a "deposit" function that allows the client to deposit units of the cryptocurrencies into the contract, b) an "add charge" function that sends back a pre-defined amount of cryptocurrencies for each file add operation, c) a "search charge" function that sends back a pre-defined amount of cryptocurrencies for each keyword search operation, d) a "judge" function that allows the client and storage peer(s) to verify the integrity of storage and search functions. e) a "finalize" function that allows the peer(s) to learn about whether the rental service duration of this smart contract is finalized. If the duration reaches, the smart contract withdraws all the assets that the contract holds.

In yet another preferable embodiment, the method is further improved with an optimization, wherein each of the records associated with the at least one operation is time-stamped, and at least one expired records in the ledger is not processed.

Blockchain systems may be implemented in an append-only manner, and the recorded transactions will stay on the chain as long as the blockchain system operates. Although add and search transactions may be recorded on the blockchain, some entries will not be used again if the rental service is expired. Hence, keeping them on the chain will inevitably introduce enormous storage overhead.

Preferably, to address this issue, maintaining the blockchain or the ledger may be further optimized. The global time may be utilized as the intermediate reference to reach consensus. As a result, the peers may verify the blockchain from an intermediate block rather from the beginning for fair judgments. The expired transactions need not to be processed.

Figure 4:
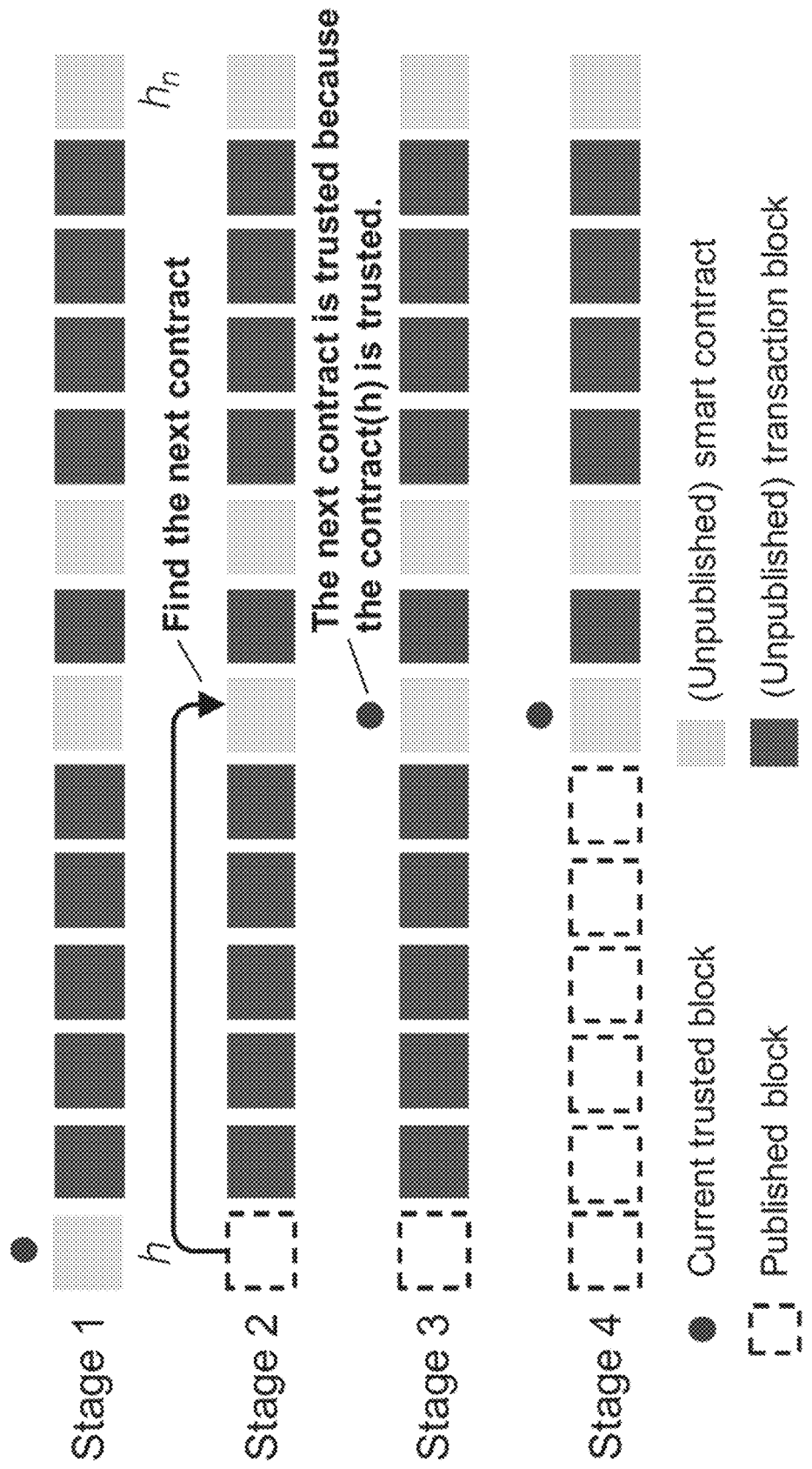
FIG. 4 is an illustration showing an example operation of the electronic storage system of FIG. 2, wherein the entries of the ledger of the system are selectively processed.

With reference to FIG. 4, one can check whether a smart contract is active or not using the global time as a reference. In this example, the globally accepted blockchain is validated and accessed from the first active smart contract which is marked as the current trusted block. Once that smart contract reaches the rental duration time, it becomes expired and the next active smart contract is marked as the current trusted block. To save the blockchain storage cost at local without compromising security, the transactions and smart contracts recorded before the current trusted block will be published to a place where every peer can access, e.g., a website or a public cloud.

In an alternative example, a similar technique may be adopted in a blockchain based DNS service. Client A may maintain a smart contract from date 8 to 10, and at date 9 client B may establish a smart contract from date 9 to 11. Then all transactions from A and B will be recorded after B's smart contract, which starts at date 9. When the date turns to 10, A's smart contract becomes expired. Yet, B's contract is still active, and thus it is elected as the current trusted block. After that, all transactions from date 8 to 9 are expired and published.

These embodiments may be advantageous in that the electronic storage system provides an encrypted decentralized storage architecture that can support trustworthy and private keyword search functions, therefore providing improved security and integrity of the files in a decentralized storage system.

Advantageously, client-side verifiability and blockchain based fair judgments on the search results may be facilitated. In addition, an efficient dynamic searchable encryption process may be integrated as an instantiation to lower the blockchain overhead.

The inventors have also analyzed the security and the performance of the electronic storage system in accordance with the embodiments of the present invention.

Regarding the confidentiality of files and query keywords, it was observed that the storage system achieves a comparable security strength of SSE, i.e., revealing controlled information to the storage peers. In this analysis, three leakage functions were defined, namely $L_{search}$, $L_{add}$, and $L_{encrypt}$. First, $L_{search}(w)=(Access(w), \tau_w)$. Access(w) is the access pattern defined as set:

$$\{ID(f_i): w \in f_i \text{ and } f_i \in f\}$$

where w is a keyword, $ID(f_i)$ is the file ID of file $f_i$, and f is the set of all outsourced files. The search token $\tau_w$ indicates the repeated query keywords, but it does not tell the contents of keywords. Second, $L_{add}(f)=(ID(f), len(\sigma), history(\sigma), H(f))$, where $\sigma$ is the set of unique keywords in f, H(f) is the set hash value of f, and history($\sigma$)=is a set:

$$\{ID(f_i): \forall w_j \in \sigma \text{ and } \tau_{w_j} \in \theta, ID(f_i) \in \zeta_w(\tau_{w_j})\}$$

where $\zeta_w$ is the search index and $\theta$ is the search history. Third, $L_{encrypt}(f)=len(f)$, where len(f) is the length of f.

To verify that the targeted storage peer has sent the correct results to the keyword w, the set hash of each result file is considered additive. Consequently, if there are n files as the result, for all $1 \le i \le n$, the client aggregates all $\{h_i\}$ using function $+_H$. Then a challenge set hash h is returned and verified by the soundness of the set hashing function. The attacker can hardly forge a valid $h_c$ if she/he does not has the correct posting list $I_w$ and the set hashing function.

In another example, consider the attacker may generate a valid forgery $h_c$ such that $h_c=h$ without knowing $I_w$, it implies that there exit two different sets, namely $S_1$ and $S_2$, such that $H(S_1)=_H H(S_2)$. Yet, it violates the collision resistant assumption of the set hashing function H.

For the reliability of judgments, it is assumed that the PoW consensus protocol in the blockchain, where no entity within the network will gather more than 50% of the processing power and corrupt the globally accepted blockchain. To conduct fair judgments for service integrity, the challenge answer dig and the set hash h are recorded on the blockchain. Hence, integrity fairness is ensured because neither client nor storage peer can modify and deny the recorded information.

The performance of the electronic storage system may be evaluated from two perspectives. The first is the search and file addition functions for encrypted keyword search. The second is the fair judgment operation based on the blockchain. It is assumed that fair judgments will not affect the performance of the encrypted keyword search functions. The reason is that fair judgments are served as an additional precaution to detect malicious behaviors, which mainly access the blockchain as an independent execution process.

Regarding the search and file addition functions, $T_{HMAC}$ and $T_{Set}$ were defined as the computation cost of computing a HMAC-SHA-1 function and a set hashing function respectively. The computation complexity of client and storage peers is given in the Table below.

|  | Search | Update |
| --- | --- | --- |
| Client | $T_{HMAC}$ | $2T_{HMAC} + T_{Set}$ |
| Storage peer | $len(c^*) * (T_{HMAC} + T_{Set})$ | $T_{Set}$ |

For the search function, the client generates a search token $\tau_w$ with an estimated cost of one $T_{HMAC}$. Recall that storage peers conduct the search operation in two cases. In the first case, if $\tau_w$ has not been searched before, it retrieves the results from scanning the file index $\zeta_f$ and generates the set hash of the search results. Therefore, the computation cost scales in the number of the unique keywords in all files, i.e., $len(c^*)$, with an estimated cost of $len(c^*)*(T_{HMAC}+T_{Set})$.

In the second case, if $\tau_w$ has been searched before, the peer retrieves the search results and set hash directly from the search index $\zeta_w$ and the digest index $T_{peer}$ and thus the cost is O(1). One property of the SSE process is that when more and more keywords are searched, the second case will happen more frequently. Namely, the search operation will achieve asymptotically optimal search time in the long run.

For file addition, the client generates an add token $\delta_f$ with an estimated cost of two $T_{HMAC}$ for computing the token $\tau_w$, the ciphertext $c_i$, and one $T_{Set}$ for computing a set hash h in each distinct keyword processing. Then storage peers process $\delta_f$ with an estimated cost of one $T_{Set}$ for computing a set hash for each keyword. Besides, a checklist $T_{client}$ is maintained by the client for search result verification. The size of $T_{client}$ is linear in the number of distinct keywords parsed from all uploaded files.

Blockchain is leveraged as a global ledger for fair judgments. Recall that one transaction is needed to be recorded on the chain for each addition or search function. The table as follows shows the size of transactions generated in search and file addition operations.

| Transactions | Blockchain storage cost |
|---|---|
| search | 0.2 KB |
| add | 0.2 KB |

For search, a transaction includes one RSA signature $sign_{\tau_w}$ of 128 bytes, one HMAC digest $\tau_w$ of 20 bytes, and one set hash $h_m$ of 32 bytes, with an overall estimated cost of 0.2 KB. For file addition, a transaction includes one RSA signature $sign_{\delta_f}$, one digest dig of 16 bytes, one location URL of 4 bytes, and one set hash h', with an overall estimated cost of 0.2 KB. Ethereum was used as a reference to indicate the block confirmation time, e.g., 14 seconds per transaction.

Recall that a fair judgment operation requires the involved peers to repeat the search operation and aggregate the related set hashes on the blockchain. Accordingly, given a file index $\zeta_f$, the cost of this operation is equal to $len(c^*)^*T_{HMAC}$ and $t^*T_{Set}$, where t denotes the number of related add transactions on chain.

For simplicity, it may be assumed that every peer in the service always maintains a globally accepted blockchain via a certain consensus protocol, and each transaction is valid and correctly recorded on the blockchain in the time order.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include standalone computers, network computers and dedicated hardware devices. Where the terms "computing system" and "computing device" are used, these terms are intended to cover any appropriate arrangement of computer hardware capable of implementing the function described.

It will be appreciated by persons skilled in the art that the term "database" may include any form of organized or unorganized data storage devices implemented in either software, hardware or a combination of both which are able to implement the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method of data management, comprising the steps of:
    partitioning source data into a plurality of portions of data;
    initializing a plurality of storage peers associated with a client arranged to store the plurality of portions of data in the plurality of storage peers, including initializing each of the plurality of storage peers with an encrypted file index, a keyword search index, a posting list arranged to store keyword search results and an empty table to store set hashes;
    generating a public key and a private key and forming therefrom a public key and private key pair for encrypting the plurality of portions of data and a plurality of data portion indices;
    storing each portion of data of the plurality of portions of data separately in a respective one of the plurality of storage peers; and
    storing, in each respective one of the plurality of storage peers, a data portion index that corresponds to the portion of data separately stored therein, thereby storing the plurality of data portion indices in the plurality of storage peers;
wherein each of the plurality of storage peers is arranged to store the index and corresponding portion of data in corresponding pairs, wherein the portions of data and indices are encrypted using the generated public key; and
wherein the method further comprises the step of adding a new file in at least one of the plurality of storage peers by:
    generating an add token including at least one of the plurality of portions of data and the corresponding data portion indices;
    signing the add token; and
    transferring the signed add token to the at least one of the plurality of storage peers.

2. A method of data management in accordance with claim 1, wherein the plurality of storage peers combines to define a decentralized storage volume.

3. A method of data management in accordance with claim 1, wherein the step of initializing the plurality of storage peers associated with the client comprises the step of initializing the client with private keys associated with the encrypted portions of data and data portion indices, an empty set arranged to store set hashes, an empty list arranged to maintain a search history and a set hashing function.

4. A method of data management in accordance with claim 3, wherein the set hashing function is shared by the client and the plurality of storage peers.

5. A method of data management in accordance with claim 1, wherein the step of adding the new file further comprising the step of verifying and storing the add token in the storage peer.

6. A method of data management in accordance with claim 1, wherein the step of adding the new file further comprising the step of updating the encrypted file index and the keyword search index associated with the new file.

7. A method of data management, comprising the steps of:
partitioning source data into a plurality of portions of data;
initializing a plurality of storage peers associated with a client arranged to store the plurality of portions of data in the plurality of storage peers, including initializing each of the plurality of storage peers with an encrypted file index, a keyword search index, a posting list arranged to store keyword search results and an empty table to store set hashes;
generating a public key and a private key and forming therefrom a public key and private key pair for encrypting the plurality of portions of data and a plurality of data portion indices;
storing each portion of data of the plurality of portions of data separately in a respective one of the plurality of storage peers; and
storing, in each respective one of the plurality of storage peers, a data portion index that corresponds to the portion of data separately stored therein, thereby storing the plurality of data portion indices in the plurality of storage peers;
wherein each of the plurality of storage peers is arranged to store the data portion index and corresponding portion of data in corresponding pairs, wherein the portions of data and the data portion indices are encrypted using the generated public key; and
wherein the method further comprises the step of searching the plurality of portions of data stored in the plurality of storage peers, including:
generating, in the client, a search token including at least one search keyword;
signing the search token; and
transferring the signed search token to the at least one of the plurality of storage peers.

8. A method of data management in accordance with claim 7, wherein the step of searching the plurality of portions of data further comprising the step of verifying and processing the search token in the storage peer.

9. A method of data management in accordance with claim 1 or 7, further comprising the step of maintaining a ledger arranged to record at least one operation associated with the plurality of portions of data or the plurality of data portion indices.

10. A method of data management in accordance with claim 9, wherein the ledger includes at least one unmodifiable entry associated with the at least one operation.

11. A method of data management in accordance with claim 10, wherein the at least one operation includes adding a new file and/or processing a search request.

12. A method of data management in accordance with claim 9, wherein the ledger includes a blockchain structure.

13. A method of data management in accordance with claim 9, further comprising the step of issuing a fair judgment request based on at least one operation recorded in the ledger.

14. A method of data management in accordance with claim 13, wherein each of the records associated with the at least one operation is time-stamped; and wherein at least one expired records in the ledger is not processed.

15. An electronic storage system, comprising a plurality of storage peers arranged to store a plurality of portions of data and a plurality of data portion indices, each of the plurality of storage peers is arranged to separately store a respective portion of data of the plurality of portions of data, and each of the plurality of storage peers is further arranged to store a respective one of the plurality of data portion indices that corresponds to the portion of data separately stored therein;
wherein a source data is partitioned to form the plurality of portions of data;
wherein the plurality of storage peers are associated with a client arranged to store the plurality of portions of data in the plurality of storage peers;
wherein each of the plurality of storage peers is arranged to store a data portion index and corresponding portion of data in corresponding pairs;
wherein each of the plurality of peers is arranged to generate a public key and a private key and form therefrom a public key and private key pair for encrypting the plurality of portions of data and the plurality of data portion indices;
wherein the portions of data and the data portion indices are encrypted using the generated public key; and
wherein the plurality of storage peers is further arranged to receive and process an add token including at least one of the plurality of portions of data and the corresponding data portion indices so as to add a new file in the plurality of storage peers; wherein the add token is generated in the client adding the new file.

16. An electronic storage system in accordance with claim 15, wherein the plurality of storage peers combines to define a decentralized storage volume.

17. An electronic storage system comprising a plurality of storage peers arranged to store a plurality of portions of data and a plurality of data portion indices, each of the plurality of storage peers is arranged to separately store a respective portion of data of the plurality of portions of data, and each of the plurality of storage peers is further arranged to store a respective one of the plurality of data portion indices that corresponds to the portion of data separately stored therein;
wherein a source data is partitioned to form the plurality of portions of data;
wherein the plurality of storage peers are associated with a client arranged to store the plurality of portions of data in the plurality of storage peers;
wherein each of the plurality of storage peers is arranged to store a data portion index and the corresponding portion of data in corresponding pairs;
wherein each of the plurality of peers is arranged to generate a public key and a private key and form therefrom a public key and private key pair for encrypting the plurality of portions of data and the plurality of data portion indices;
wherein the portions of data and the data portion indices are encrypted using the generated public key; and
wherein the plurality of storage peers is arranged to receive and process a search token including at least one search keyword; wherein the search token is generated in a client initiating the search request.

18. An electronic storage system in accordance with claim 15 or 17, further comprising a ledger arranged to record at least one operation associated with the plurality of portions of data or the plurality of data portion indices.

19. An electronic storage system in accordance with claim 18, wherein the ledger includes at least one unmodifiable entry associated with the at least one operation.

20. An electronic storage system in accordance with claim 18, wherein the at least one operation includes adding a new file and/or processing a search request.

21. An electronic storage system in accordance with claim 18, wherein the ledger includes a blockchain structure.

22. An electronic storage system in accordance with claim 18, wherein the plurality of storage peers are further arranged to issue a fair judgment request based on at least one operation recorded in the ledger.

23. An electronic storage system in accordance with claim 22, wherein each of the records associated with the at least one operation is time-stamped; and wherein at least one expired records in the ledger is not processed.

* * * * *